United States Patent
Dansui et al.

(10) Patent No.: US 6,692,864 B1
(45) Date of Patent: Feb. 17, 2004

(54) BATTERY PACK AND POWER TOOL USING THE SAME

(75) Inventors: Yoshitaka Dansui, Kanagawa (JP); Hironori Ura, Kanagawa (JP); Sadaaki Yokoo, Kanagawa (JP); Michio Hirota, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,312

(22) PCT Filed: Jan. 14, 2000

(86) PCT No.: PCT/JP00/00146

§ 371 (c)(1),
(2), (4) Date: Jun. 4, 2001

(87) PCT Pub. No.: WO01/03231

PCT Pub. Date: Jan. 11, 2001

(30) Foreign Application Priority Data

Jul. 5, 1999 (JP) ............................................. 11-190026

(51) Int. Cl.[7] ........................ H01M 10/50; H01M 2/10; H01M 2/26; H01M 10/38; H01M 6/42
(52) U.S. Cl. ........................... 429/120; 429/99; 429/100; 429/121; 429/123; 429/156; 429/164
(58) Field of Search ................................. 429/120, 121, 429/149, 156, 164, 98, 99, 100, 123

(56) References Cited

U.S. PATENT DOCUMENTS

| | | | |
|---|---|---|---|
| 3,537,907 A | 11/1970 | Wilson | 136/132 |
| 4,871,629 A | 10/1989 | Bunyea | 429/97 |
| 5,756,227 A * | 5/1998 | Suzuki et al. | 429/62 |
| 6,455,186 B1 * | 9/2002 | Moores et al. | 429/71 |

FOREIGN PATENT DOCUMENTS

| | | |
|---|---|---|
| DE | 41 14 576 | 10/1991 |
| EP | 0 994 523 | 4/2000 |
| JP | 6-223804 | 8/1994 |
| JP | 7-14616 | 1/1995 |
| JP | 07-045310 | * 2/1995 |
| WO | WO 89/10011 | 10/1989 |

* cited by examiner

Primary Examiner—Patrick Ryan
Assistant Examiner—Thomas H. Parsons
(74) Attorney, Agent, or Firm—RatnerPrestia

(57) ABSTRACT

A battery pack suppresses temperature rise of secondary battery during charging and discharging. The battery pack includes a plurality of batteries stacked up, a case enclosing the plurality of batteries, a heat collector disposed near the battery positioned in the center of the plurality of batteries, a heat radiator placed at one side of the case, and a first heat transfer unit placed for connecting the heat collector and heat radiator. Further, the battery pack includes a heat transfer plate placed at the other side of the case, and a second heat transfer unit placed between the heat collector and heat transfer plate.

29 Claims, 5 Drawing Sheets

BATTERY PACK AND POWER TOOL USING THE SAME

This application is a U.S. National Phase application of PCT International Application PCT/JP00/00146.

TECHNICAL FIELD

The present invention relates to a battery pack having a plurality of batteries, and a power tool using the battery pack.

BACKGROUND ART

As the batteries for use in power tools, generally, the nickel-cadmium secondary batteries are used. Recently, however, nickel-hydrogen secondary batteries have come to be used. In the high power trend of power tools, the battery pack used in the power tools is required to withstand a high voltage and a strong electric discharge, and therefore the number of secondary batteries used in one battery pack is increasing rapidly.

Conventionally, this kind of battery pack is constituted as shown in FIG. 5, in which a plurality of cylindrical secondary batteries 1 are stacked up in layers, and electrodes of each battery 1 are connected electrically in series or parallel by means of terminals.

Secondary batteries such as closed type nickel-cadmium secondary battery and nickel-hydrogen secondary battery are elevated in temperature due to Joule heat generated at the time of charging and discharging and the reaction heat due to gas absorption reaction. Therefore, when multiple of cells are disposed in a specified space as in the conventional battery pack, the battery temperature may exceed 80° C. (The exothermic temperature differs with the charging current or discharging characteristic of the battery.) When a plurality of batteries are stacked up in layers, the battery position in the center of the plurality of batteries is poor in heat release performance because it is surrounded by other batteries, and the temperature rise of the battery in the central position is extremely high as compared with other batteries.

Besides, the heat is likely to be transferred upward, and therefore the temperature is higher in the batteries in the upper position as compared with the batteries in the lower position of the stack of batteries. Thus, the battery temperature rises and the individual stacked batteries have mutually different temperatures. Generally, in the alkaline secondary battery, at high temperature, the charging characteristic is lowered and the charge-discharge cycle life characteristic deteriorates.

To prevent temperature rise of battery, a method of placing metal plates between cells and release heat from one end is disclosed, for example, in Japanese Laid-open Patent No. 7-14616. Japanese Laid-open Patent No. 6-223804 discloses a method of installing a cooling plate only in the battery placed in the center of the stacked batteries.

When the battery pack having stacked batteries is used in a power tool, the battery pack is put in a discharge compartment in the main body of the power tool. In this structure, the electric power is supplied when loaded, and after discharge, it is put in a charge compartment of a charger, and is charged.

In such structure, however, the battery positioned in the center among the stacked batteries is poor in heat release because it is surrounded by other batteries. As a result, the central battery is elevated in temperature due to heat generation during charging, and the charging efficiency in the central battery is lowered. When the batteries are discharged, since the motor of the power tool is driven, a large current flows. As the large current flows, the battery temperature is further elevated.

It is hence an object of the invention to present a cylindrical secondary battery pack for suppressing lowering of charging characteristic and deterioration of life by lowering the temperature rise of batteries due to heat generation. It is also an object to present a power tool using such battery pack.

SUMMARY OF THE INVENTION

The battery pack of the invention comprises:
a plurality of stacked batteries,
a case enclosing the plurality of batteries,
a heat collector placed near the battery position in the center of the plurality of batteries, and
a heat radiator coupled to the heat collector, and placed at one side of the case.

Preferably, the plurality of batteries are a plurality of secondary batteries.

Preferably, the battery pack further comprises a first heat transfer unit placed by connecting the heat collector and heat radiator.

Preferably, the battery pack further comprises a heat transfer plate placed at other side of the case, and a second heat transfer unit placed between the heat collector and the heat transfer plate.

Preferably, each battery of the plurality of secondary batteries has a cylindrical shape.

Preferably, the plurality of cylindrical batteries are stacked up in the state that straw bags are stacked.

In this constitution, heat generation of the battery pack due to charging and discharging of batteries is suppressed. During use, deterioration of discharge characteristic is prevented, and a secondary battery pack having an excellent discharge characteristic is obtained. Moreover, a secondary battery pack having a high power is obtained.

The power tool of the invention comprises:
a housing,
a power unit placed in the housing,
a junction placed in the housing, and
an external heat collecting plate placed in the junction, for contacting and connecting a battery pack as the driving source.

Preferably, the power tool further comprises the battery pack placed in contact with the external heat collecting plate.

Preferably, the power tool further comprises:
an opening formed in the housing, and
an external heat radiator placed near the opening in the housing, in which the heat in the external heat radiator is released through the opening.

Preferably, the power tool further comprises:
an opening formed in the housing,
an external heat radiator placed near the opening in the housing, and
an external heat transfer unit placed between the external heat collecting plate and external heat radiator, in which the heat generated in the battery pack is released from the opening through the external heat collecting plate, external heat transfer unit and external heat radiator.

In this constitution, deterioration of driving force during use is prevented, and a power tool capable of maintaining a specified driving force continuously is obtained.

BEST MODE FOR CARRYING OUT THE INVENTION

A battery pack in an embodiment of the invention includes a plurality of cylindrical secondary batteries stacked up in a state that straw bags are stacked, and a case enclosing the plurality of secondary batteries. The plurality of secondary batteries are electrically connected in series and/or parallel, and a battery group is composed. A heat collector is placed in the center of the battery group. A heat radiator is placed at one side of the case. The heat collector and the heat radiator are connected with each other by means of a first heat transfer unit. A heat transfer plate is placed at a opposite side of the heat radiator. The heat collector and heat transfer plate are connected by means of a second heat transfer unit.

Preferably, the material for the heat collector is any one of heat conductive high polymer, aluminum, and copper having an excellent heat conductivity, or a combination thereof.

As the heat transfer unit, a heat pipe having a heat transfer rate of about 10 times as compared with the metal of same sectional area is used.

As the heat radiator, a fin type heat sink is used for enhancing the heat releasing performance. As the material for the fin type heat sink, aluminum, copper or heat conductive high polymer having high heat conductivity is used.

A power tool in an embodiment of the invention includes a housing, an external heat radiator, an external heat collector, an external heat transfer unit, and a battery pack. The housing has an air intake port and an exhaust port. The external heat radiator is placed near the air intake port or near the exhaust port. The external heat radiator and external heat collector are mutually connected with an external heat transfer unit. The external heat collector is placed at the main body side of the junction between the battery pack and the power tool main body.

As the material for the external heat collector, aluminum, copper or heat conductive high polymer having high heat conductivity, or a combination thereof is used.

As the material for the heat sink, aluminum, copper or heat conductive high polymer having high heat conductivity is used.

An exemplary embodiment of the invention is specifically described below.

Figure 1:
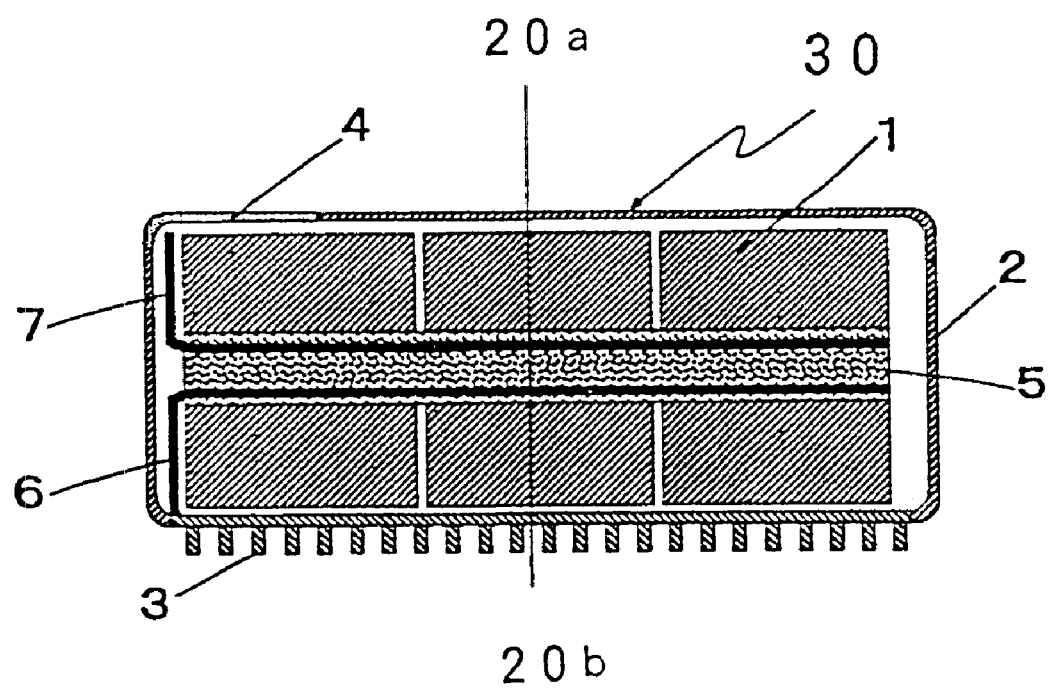
FIG. 1 shows a central cross sectional view of a battery pack 30 in an embodiment of the invention.

FIG. 1 is a cross sectional view of cutting off from the center of a cylindrical secondary battery pack 30 in an embodiment of the invention. In FIG. 1, a plurality of nickel-hydrogen secondary batteries 1 are put in a battery case 2. As a heat radiator, a fin type heat sink 3 is placed at the outer side of the battery case 2. The heat sink 3 has a function of releasing heat generated when charging the battery pack. A heat collector 5 is placed in the center of the plurality of batteries. The heat collector 5 has a function of collecting the heat generated in the batteries 1 efficiently. As a heat transfer unit, a first heat pipe 6 is placed for connecting between the heat collector 5 and heat sink 3. The first heat pipe 6 has a function of transferring the heat collected in the heat collector 5 to the heat sink 3. A heat transfer plate 4 is placed in the battery case 2, and the heat transfer plate 4 is place at a opposite side of the heat sink 3. The heat transfer plate 4 is placed at outside of the case 2 or in part of the case 2. A second heat pipe 7 as a heat transfer unit is placed between the heat collector 5 and the heat transfer plate 4. The second heat pipe 7 has a function of transferring the heat collected in the heat collector 5 to the heat transfer plate 4.

Figure 2:
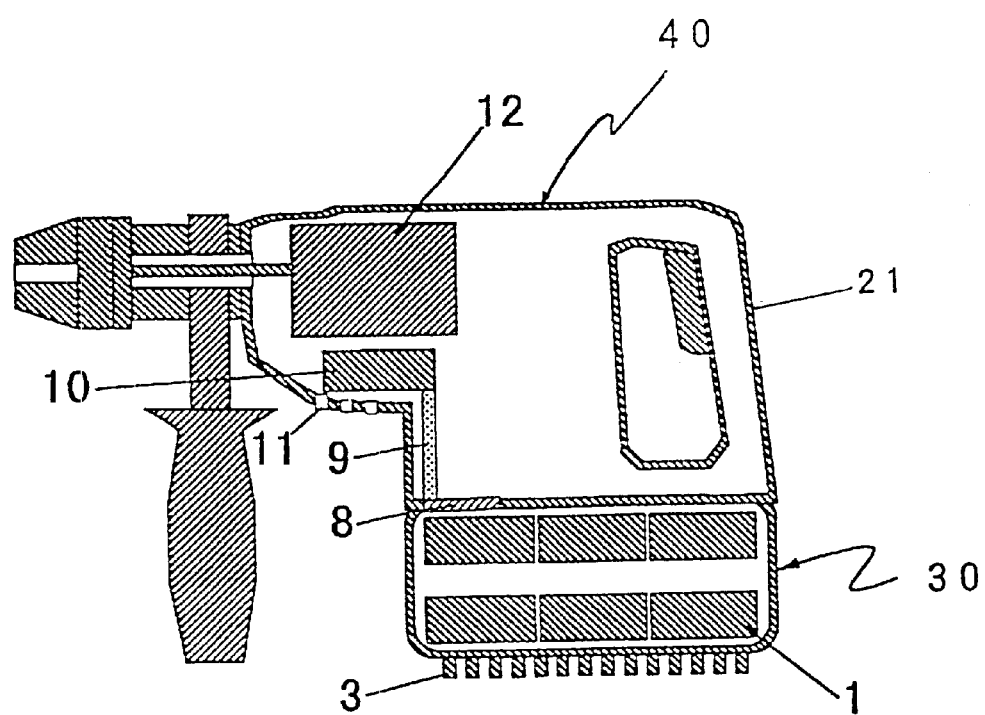
FIG. 2 is a cross sectional view of a power tool 40 having a battery pack in an embodiment of the invention.

FIG. 2 is a cross sectional view of a power tool 40 using the battery pack 30 in an embodiment of the invention. In FIG. 2, the power tool 40 includes a housing 21, a motor 12, the battery pack 30, a ladder type external heat sink 10, an external heat pipe 9, and an external heat collecting plate 8. Air intake and exhaust ports 11 are formed in a housing 21. The intake and export ports 11 suck and exhaust the air in the power tool 40. The battery pack 30 has the same structure as the battery pack shown in FIG. 1.

Figure 3:
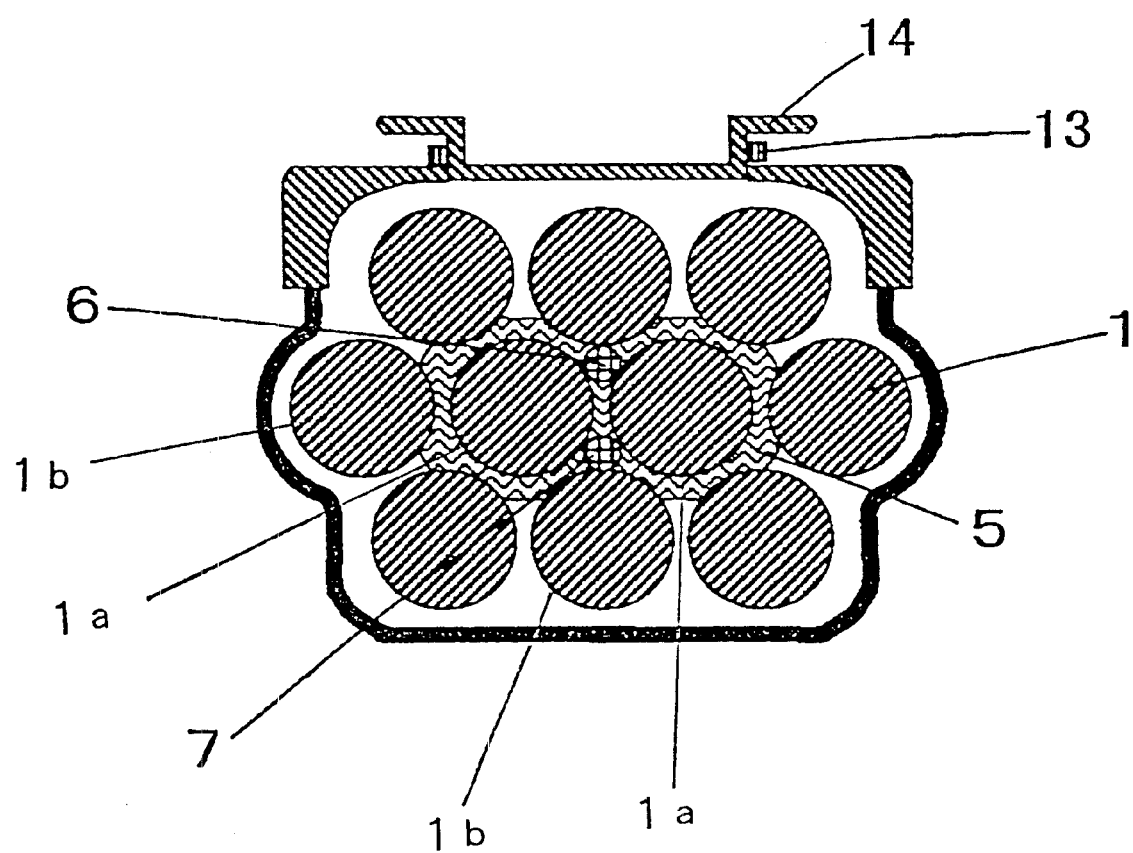
FIG. 3 is a cross sectional view along line 20a–20b of the battery pack 30 shown in FIG. 1.

FIG. 3 is a cross sectional view along line 20a–20b orthogonal to the central cross sectional view of the battery pack 30 shown in FIG. 1. In FIG. 3, the battery pack 30 has a junction 13 and a terminal 14. The junction 13 has a function of fitting the battery pack 30 and power tool 40. The terminal 14 has a function of connecting with the main body of the power tool 40 or a charger 15 electrically.

Figure 4:
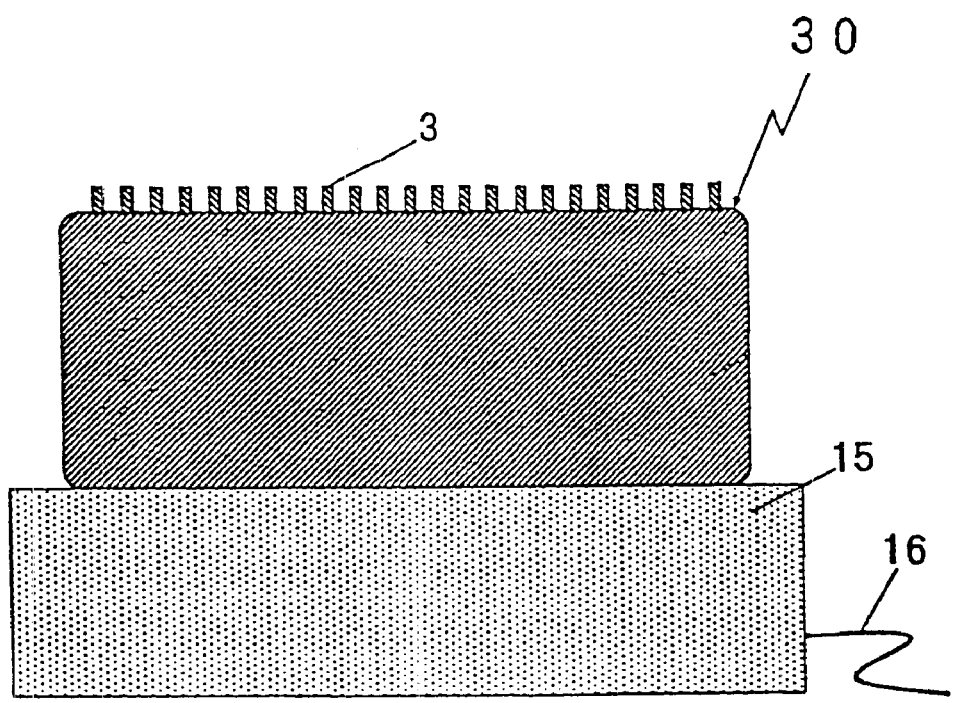
FIG. 4 is a side view of the battery pack 30 installed in a charger in an embodiment of the invention.
Figure 5:
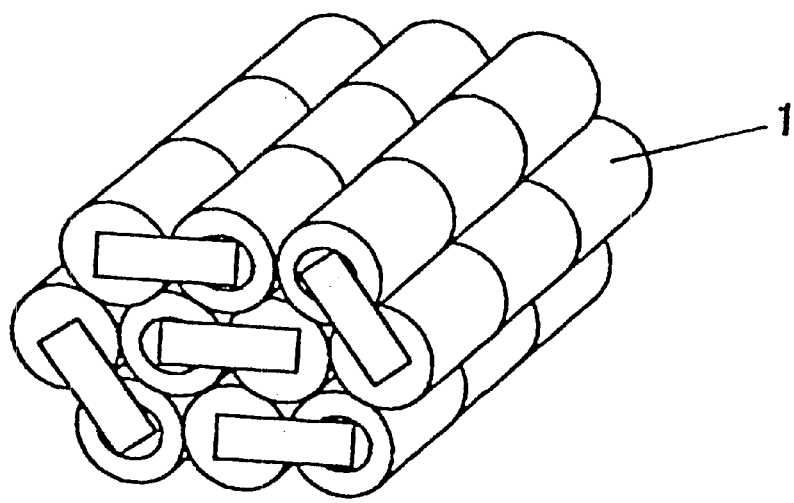
FIG. 5 is a perspective view of a plurality of cylindrical secondary batteries used in a conventional secondary battery pack.

FIG. 4 is a cross sectional view when the battery pack 30 is set in the charger 15. In FIG. 4, a cord 17 connected to the charger 15 is connected to an AC power supply (not shown).

This exemplary embodiment is further described below while referring to the drawings.

As shown in FIG. 1, the plurality of cylindrical nickel-hydrogen secondary batteries 1 are stacked up in the state straw bags are stacked, and put in the battery case 2. The plurality of batteries 1 are mutually connected electrically in series or parallel. The stacked state that straw bags, which means that each battery of the plurality of batteries is placed in the upper position or lower position of the middle of the batteries placed adjacent to each other.

As shown in FIG. 3, the batteries 1a positioned in the center are surrounded by other batteries 1b. The central batteries 1a are covered with the heat collector 5. The heat collector 5 is made of aluminum, copper or heat conductive high polymer having a high heat conductivity. The first heat pipe 6 as the first heat transfer unit and the second heat pipe 7 as the second heat transfer unit are placed to contact with the heat collector 5.

One end of the heat pipe 6 is connected to the heat collector 5, and other end of the first heat pipe 6 is connected to the fin type heat sink 3 as the heat radiator. The fin type heat sink 3 is placed at the outer side of the battery case 2. As the heat sink 3, a structure having multiple fins is preferred. By the multiple fins, the surface area is increased, and the heat releasing performance is notably enhanced. As the material for the heat sink 3, aluminum, copper or heat conductive high polymer having high heat conductivity is preferred.

One end of the second heat pipe 7 is connected to the heat collector 5, and other end of the second heat pipe 7 is connected to the heat transfer plate 4.

In FIG. 2, on the mutually contacting faces of the housing 21 of the power tool 40 and the battery pack 30, an external heat collecting plate 8 is placed. Inside of the power tool 40, there is an opening 11 having an intake port and an exhaust port for releasing the heat in the power tool 40 to the outside. Near the opening 11, an external heat sink 10 is placed as an external heat radiator. The external heat sink 10 has a lattice shape. The external heat collecting plate 8 and external heat sink 10 are connected with each other by means of an external heat pipe 9 as an external heat transfer unit. The external heat pipe 9 has a heat transfer rate of more than 100 times that of metal.

Referring to FIG. 1 to FIG. 3, the operation of the power tool in discharge of battery (that is, while the power tool 40 is operating) is specifically described below. As the power tool, for example, a power drill, a power planer, a power grinder, or any other tool driven by batteries can be used.

When the motor 12 in the power tool 40 is put in motion, the nickel-hydrogen secondary batteries 1 in the battery pack 30 are discharged. By this discharge, current I of about 10 to 70 A flows. When the plurality of batteries 1 are connected in series or parallel, Joule heat is generated by resistance R such As the internal resistance of each battery 1 and the resistance of connecting leads for connecting the batteries 1 electrically. The Joule heat (Q) is expressed as $Q=I^2R$. Therefore, the Joule heat is generated by the amount corresponding to the square of the flowing current. It means that the generated heat is increased as the driving force of the power tool 40 becomes high power.

The heat generated from the batteries by the discharge of batteries is efficiently collected by the heat collector 5. The collected heat is transferred to the heat transfer plate 4 through the heat pipe 9 having an excellent heat transfer rate. While the battery pack 30 is coupled with the power tool 40, the heat transfer plate 4 and the external heat collecting plate 8 are placed so as to contact tightly with each other. Accordingly, the heat collected in the heat collector 5 is easily transferred to the external heat collecting plate 8 through the heat transfer plate 4, and is further transferred to the external heat sink 10 through the external heat pipe 9. Thus, the heat generated in the battery pack 30 is released outside of the tool through the external heat sink 10.

The power tool 40 of the embodiment has the intake and exhaust ports 11 for releasing the heat generated by the motor 12 to outside from the housing 21 of the power tool 40. The external heat sink 10 is placed near the exhaust ports 11, and the external heat sink 10 is located at a position for receiving the wind generated from the motor 12. Thus, the external heat sink 10 is cooled by air by force. The heat release efficiency when the external heat sink 10 is cooled by air by force is about 10 times higher than the heat release efficiency in the case of spontaneous air cooling. Therefore, the surface area of the external heat sink 10 in the constitution of the embodiment can be extremely reduced. That is, the external heat sink 10 can be reduced in size, while a sufficient heat release efficiency is assured.

The cooling capacity of the external heat sink 10 used in the embodiment is about 10 to 12 W. As a result, in the constitution of the embodiment, during discharge of batteries 1, the temperature rise was suppressed at least by about 10° C.

The heat release action while charging the battery pack 30 is described below by referring to the drawing.

FIG. 4 is a cross sectional view of coupling of the charger 15 and the battery pack 30. When the battery pack 30 is set in the charger i5, the heat sink 3 incorporated in the battery pack 30 is directed upward. The heat is likely to be transferred upward, and the first heat pipe 6 is also likely to transfer the heat upward. Accordingly, by the first heat pipe 6 placed in the heat collector 5, the heat generated at the time of charging of the batteries 1 is efficiently transferred to the heat sink 3, and this heat is released from the heat sink 3. In this manner, the temperature rise of the battery pack 30 is suppressed.

The cooling capacity of the heat sink 3 used in the battery pack 30 of the embodiment is about 6 to 8 W, and the rise of battery temperature could be suppressed by 10° C.

In the battery pack 30 of the embodiment, meanwhile, the fin type heat radiator is used as the heat sink 3, and the latter type heat radiator is used as the external heat sink 10 of the power tool 40, but not limited to them, the heat radiator of various shapes having similar cooling capacity can be similarly employed.

In the embodiment, the secondary batteries are used as the batteries, but other batteries can be also used. It is preferred to use batteries accompanied by heat generation during use. In particular, batteries accompanied by heat generation such as secondary batteries are preferred, and an extremely excellent effect will be obtained in such cases.

Further, as the material for the heat sink 3, heat transfer plate 4, heat collector 5, external heat collecting plate 8 and external heat sink 10, aluminum, copper, or heat conductive high polymer, or a combined material thereof may be used. As the conductive high polymer, a composite high polymer material may be used, such as alumina or boron nitride having excellent heat conductivity mixed in high polymer such as silicone rubber or resin.

INDUSTRIAL APPLICABILITY

By providing the battery pack and power tool of the invention with the cooling function, the temperature rise of the secondary batteries during charging is suppressed, and the temperature rise during discharging is also suppressed. As a result, deterioration of discharge characteristic during use is prevented, and a battery pack having an excellent discharge characteristic is obtained. Further, a secondary battery pack having a high power is obtained. The charging and discharging characteristic of the secondary battery is sufficiently exhibited. Moreover, the charging and discharging cycle life is notably extended. During use, too, deterioration of driving force is prevented, and a power tool capable of keeping an excellent driving force continuously is realized.

What is claimed is:

1. A battery pack used as a power source of a power tool, said battery pack comprising:

a plurality of batteries stacked up, a case enclosing said plurality of batteries, a cooling unit, a heat collector disposed near a battery positioned in a center of said plurality of batteries, a heat radiator placed at one side of said case, said heat radiator being coupled with said heat collector, and a heat transfer plate placed at another side of said case wherein said power tool includes a housing having a junction, a power unit placed in said housing, and an external heat collecting plate disposed at the junction, said cooling unit of said battery pack has a heat transfer plate, said battery pack is connected to said junction, and said heat transfer plate contacts with said external heat collecting plate.

2. The battery pack of claim 1, wherein said plurality of batteries are a plurality of secondary batteries.

3. The battery pack of claim 1, further comprising:
a first heat transfer unit disposed between said heat collector and said heat radiator.

4. The battery pack of claim 1, further comprising:
a heat transfer plate placed at other side of said case,
a first heat transfer unit placed between said heat collector and said heat radiator, and
a second heat transfer unit placed between said heat collector and said heat transfer plate.

5. The battery pack of claim 1, wherein each battery of said plurality of batteries has a cylindrical shape.

6. The battery pack of claim 1, wherein each battery of said plurality of batteries has a cylindrical shape, and said plurality of batteries are staked up in a state that straw bags are stacked.

7. The battery pack of claim 1, wherein each battery of said plurality of batteries is connected at least one of in series and in parallel.

8. The battery pack of claim 1, wherein said heat collector is made of at least one material selected from the group consisting of aluminum, copper, and heat conductive high polymer.

9. The battery pack of claim 1, wherein said heat transfer unit has a heat pipe.

10. The battery pack of claim 1, wherein said heat radiator has a heat sink.

11. The battery pack of claim 1, wherein said heat radiator has a heat sink made of at least one material selected from the group consisting of aluminum, copper, and heat conductive high polymer.

12. The battery pack of claim 1, wherein each battery of said plurality of batteries has a cylindrical shape, and
said plurality of batteries are disposed at least at the upper and lower position of the middle of the batteries placed adjacently to each other.

13. The battery pack of claim 1, wherein said plurality of batteries have a plurality of layers stacked up in three stages or more, and said heat collector is disposed around a first battery position at an inner side of said plurality of layers.

14. The battery pack of claim 1, wherein said heat radiator has a fin type shape.

15. The battery pack of claim 1, wherein said battery pack is used as a power source of a power tool.

16. The battery pack of claim 1 used as a power source of a power tool,
wherein said power tool includes a housing having a junction, and a power unit placed in said housing,
said battery pack is connected to said junction, and
said heat radiator is exposed in an outward direction of said power tool.

17. A battery pack used as a power source of a power tool, said battery pack comprising:
a plurality of batteries stacked up,
a case enclosing said plurality of batteries,
a heat collector disposed near a battery positioned in a center of said plurality of batteries,
a heat radiator placed at one side of said case, said heat radiator being coupled with said heat collector, and
a heat transfer plate placed at another side of said case,
wherein said power tool includes a housing having a junction, a power unit placed in said housing, and an external heat collecting plate disposed at the junction,
said battery pack further has a heat transfer plate placed at other side of said case,
said battery pack is connected to said junction,
said heat transfer plate contacts with said external heat collecting plate, and
said heat radiator is exposed in an outward direction of said power tool.

18. A power tool comprising:
a housing,
a power unit placed in said housing,
a junction placed in said housing, and
an external heat collecting plate placed at said junction, said external heat collecting plate being disposed for contacting and connecting with a battery pack as a driving source.

19. The power tool of claim 18, further comprising said battery pack placed in contact with said external heat collecting plate.

20. The power tool of claim 19, wherein said battery pack has a heat transfer plate,
said heat transfer plate contacts with said external heat collecting plate, and
the heat generated in said battery pack is released through said heat transfer plate and heat collecting plate.

21. The power tool of claim 19, wherein said battery pack has a heat radiator, and a heat generated in said battery pack is released through said heat radiator.

22. The power tool of claim 19, wherein said battery pack has a heat transfer plate and a heat radiator, said heat transfer plate contacts with said external heat collecting plate, and a heat generated in said battery pack is released through said external heat collecting plate and said heat radiator.

23. The power tool of claim 18, further comprising an opening formed in said housing, and an external heat radiator disposed near said opening in said housing, wherein the heat of said external heat radiator is released through said opening.

24. The power tool of claim 23, wherein said external heat radiator has a heat sink.

25. The power tool of claim 23, wherein said external heat radiator is made of at least one material selected from the group consisting of aluminum, copper, and heat conductive high polymer.

26. The power tool of claim 18, further comprising an opening formed in said housing, an external heat radiator disposed near said opening in said housing, and an external heat transfer unit placed between said external heat collecting plate and external heat radiator,
wherein the heat generated in said battery pack is released from said opening through said external heat collecting plate, said external heat transfer unit and said external heat radiator.

27. The power tool of claim 18, wherein said external heat collecting plate is made of at least one material selected from the group consisting of aluminum, copper, and heat conductive high polymer.

28. The power tool of claim 18,
wherein said battery pack comprises a plurality of batteries stacked up, a case enclosing said plurality of batteries, a heat collector disposed near a battery positioned in a center of said plurality of batteries, and a heat transfer plate coupled to said heat collector, said heat transfer plate being placed at one side of said case,
said external heat collecting plate contacts with said heat transfer plate, and
a heat generated in said plurality of batteries is released through said heat collector, said heat transfer plate, and said external heat collecting plate.

29. The power tool of claim 18, wherein said battery pack comprises a plurality of batteries stacked up, a case enclosing said plurality of batteries, a heat collector disposed near a battery positioned in a center of said plurality of batteries, a heat transfer plate coupled to said heat collector, said heat transfer plate being placed at one side of said case, and a heat radiator coupled to said heat collecting unit, said heat radiator being placed at other side of said case, said external heat collecting plate contacts with said heat transfer plate, a heat generated in said plurality of batteries is collected in said heat collector, and a heat collected in said heat collector is released from said external heat collector and said heat radiator.

\* \* \* \* \*